US010198633B2

(12) United States Patent
Jungerman et al.

(10) Patent No.: US 10,198,633 B2
(45) Date of Patent: Feb. 5, 2019

(54) SOLAR PHOTOVOLTAIC MEASUREMENT

(71) Applicant: Vivint Solar, Inc., Lehi, UT (US)

(72) Inventors: Roger L. Jungerman, Petulama, CA (US); Mark Galli, Windsor, CA (US); Judd Reed, Sebastopol, CA (US); Willard S. MacDonald, Sebastopol, CA (US)

(73) Assignee: Vivint Solar, Inc., Lehi, UT (US)

( * ) Notice: Subject to any disclaimer, the term of this patent is extended or adjusted under 35 U.S.C. 154(b) by 123 days.

(21) Appl. No.: 15/334,839

(22) Filed: Oct. 26, 2016

(65) Prior Publication Data

US 2017/0116460 A1    Apr. 27, 2017

Related U.S. Application Data

(60) Provisional application No. 62/246,221, filed on Oct. 26, 2015.

(51) Int. Cl.
*H04N 7/18* (2006.01)
*G06K 9/00* (2006.01)
*G06K 9/46* (2006.01)
*G06T 7/73* (2017.01)

(52) U.S. Cl.
CPC ......... *G06K 9/0063* (2013.01); *G06K 9/4604* (2013.01); *G06T 7/73* (2017.01); *G06T 2207/10032* (2013.01); *G06T 2207/30184* (2013.01)

(58) Field of Classification Search
CPC .............................. G06K 9/0063; G06K 9/4604
USPC ....................................................... 348/144
See application file for complete search history.

(56) References Cited

U.S. PATENT DOCUMENTS

| 9,384,398 B2* | 7/2016 | Chen ................. G06K 9/00637 |
| 2011/0216962 A1* | 9/2011 | Kim ........................ G06T 7/507 |
| | | 382/154 |
| 2014/0067332 A1* | 3/2014 | Chen ................. G06F 17/5004 |
| | | 703/1 |

OTHER PUBLICATIONS

U.S. Appl. No. 15/189,879, filed Jun. 22, 2016, titled "Photovoltaic Measurement System", 39 pages.

* cited by examiner

*Primary Examiner* — Richard T Torrente
(74) *Attorney, Agent, or Firm* — TraskBritt (57) ABSTRACT

A solar power measurement method is provided. A method may include determining an azimuth of a reference roof edge relative to an orientation of an aerial image of a structure. The method may include capturing at least one spherical image at at least one determined measurement location proximate the structure. Further, the method may include determining a relative azimuth of the reference roof edge from a downward view of a lower hemisphere of the at least one image. In addition, the method may include determining an orientation of an upper hemisphere of the at least one image based on the azimuth of the reference roof edge, the relative azimuth of the reference roof edge, and a known tilt of a roof edge of the structure. Furthermore, the method may include calculating shading conditions for a time period for known sun positions during the time period based on the orientation of the upper hemisphere of the at least one spherical image.

17 Claims, 8 Drawing Sheets

SOLAR PHOTOVOLTAIC MEASUREMENT

CROSS-REFERENCE TO RELATED APPLICATION

A claim for benefit of priority to the Oct. 26, 2015 filing date of the U.S. Patent Provisional Application No. 62/246,221, titled SOLAR PHOTOVOLTAIC MEASUREMENT SYSTEMS, DEVICES, AND METHODS (the '221 Provisional Application), is hereby made pursuant to 35 U.S.C. § 119(e). The entire disclosure of the '221 Provisional Application is hereby incorporated herein.

TECHNICAL FIELD

The present disclosure relates generally to solar power. More specifically, embodiments of the present disclose relate to measuring shading conditions proximate a structure for maximizing electrical productions of a solar power system including the structure.

BRIEF SUMMARY

According to one embodiment, the present disclosure includes methods for measuring shading conditions for a solar power system. Various embodiments of such a method may include determining an azimuth of a reference roof edge relative to an azimuth orientation of an aerial image of a structure. The method may also include capturing at least one spherical image at at least one determined measurement location proximate the structure. Further, the method may include determining a relative azimuth of the reference roof edge from a downward view of a lower hemisphere of the at least one spherical image. In addition, the method may include determining an orientation of an upper hemisphere of the at least one spherical image via the azimuth of the reference roof edge, the relative azimuth of the reference roof edge, and a known tilt of a roof edge of the structure (i.e., when the roof edge is a rake). The method may also include calculating shading conditions for a time period for known sun positions during the time period based on the orientation of the upper hemisphere of the at least one spherical image.

In another specific embodiment, a device may include a pole and a camera coupled to the pole and configured to capture one or more spherical images of a photovoltaic installation site. The device may also include at least one indicator coupled to the pole.

Other aspects, as well as features and advantages of various aspects, of the present disclosure will become apparent to those of skill in the art though consideration of the ensuing description, the accompanying drawings and the appended claims.

DETAILED DESCRIPTION

Referring in general to the accompanying drawings, various embodiments of the present disclosure are illustrated to show the structure for solar photovoltaic measurement devices, systems, and methods. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

Solar photovoltaic (PV) cells use light energy (photons) from the sun to generate electricity through a PV effect. A PV solar module includes PV cells mounted behind glass. A PV system, which may include a plurality of solar modules and various other electrical components, may be used to generate and supply electricity in utility, commercial and residential applications. Solar modules may also be of the type that converts energy from the sun into heat that is captured in a fluid running through collectors mounted behind glass. The heated fluid may then be used, for example, to heat water for use in a home, a pool, or a business.

As will be appreciated, portions of a PV system, including at least one solar module, may be installed on a roof of a structure (e.g., a residential or a commercial structure). A conventional approach to measuring attributes of a roof (e.g., shading of the roof) includes traveling to a site of the structure, climbing on the roof, and measuring the shading of the roof with a measurement device, such as SUNEYE® provided by Solmetric Corp. of Sebastopol, Calif. As will be understood by a person having ordinary skill in the art, climbing on a roof requires not only a ladder, but also, the Occupational Safety and Health Administration (OSHA) requires safety equipment including a harness, a safety rope, and an anchor, which must be attached to the roof, typically with nails or screws. After a site survey is complete, the anchor must be removed and any holes remaining in the roof must be patched. Furthermore, the company employing the person climbing on the roof must carry workman's compensation insurance that is typically significantly higher for roof workers than for employees that do not climb on a roof.

It may be desirable to make solar access measurements near an area where one or more solar panels may be installed. These measurements may make it possible to obtain the best accuracy for nearby shading objects, which may cast shadows that vary for different locations across the roof. These measurements may be used to maximize electrical production, and to estimate total electrical production. To estimate shading for different times of day, and seasons throughout the year, it is necessary to calculate the sun position for various time periods. It may then be determined whether obstructions shade (i.e., block) the sun during any time period. As disclosed in U.S. Pat. No. 7,873,490, which is hereby incorporated by reference in its entirety, a wide angle camera image of surrounding obstructions, together with simultaneous measurements of the orientation of a camera, can be used to calculate the sun position and determine if there is shading at various time periods throughout the year. The orientation of an image capture device (e.g., a camera) may be obtained with an orientation measurement unit (OMU). An OMU may include a tilt sensor, which may include a bubble level or an electronic accelerometer. The tilt sensor may be used in conjunction with an azimuth sensor for determining the azimuth of the image. An azimuth is an angular orientation within the horizontal plane. For example, a magnetic compass measures the azimuth angle of the Earth's magnetic field lines.

As will be appreciated by a person having ordinary skill in the art, it is time consuming and potentially hazardous for an individual to make solar access measurements while being positioned on a roof. These issues are described more fully in U.S. Provisional Pat. Application No. 62/182,937, which is hereby incorporated by reference in its entirety. Thus, it is highly advantageous to make shading measurements quickly and accurately from the ground using a pole-mounted camera. A spherical camera providing a 360-degree field of view mounted on a pole is described in U.S. Provisional Pat. Application No. 62/182,937. According to one or more embodiments described herein, a pole-mounted camera (e.g., a spherical camera) can be modified to conveniently and safely make accurate shading measurements around a perimeter of a structure.

One challenge of making remote shading measurements at a job site is proper determination of the azimuth of the camera with an OMU. Compasses are prone to errors when used in the proximity of magnetic objects, such as a metal roof. A compass must be corrected for magnetic declination for the job site where a measurement is obtained. A mechanical compass is not practical for remote use on top of a pole, as it is not possible to read a compass dial directly. Further, with a typical non-keyed collapsible pole, it is not possible to place a compass at the base of the pole for the purpose of determining the orientation of the top of the pole, since the individual sections of the pole can typically rotate with respect to one another. Thus, the azimuthal orientation from the compass at the base of the pole is lost at the top of the pole with the camera.

An electronic compass is very small and compact, and can be read remotely at the top of a pole. However, electronic compasses are notoriously inaccurate as they easily become magnetized and must be recalibrated. Objects typically carried in a PV technician's tool kit, such as magnetized screwdrivers or power tools, can permanently magnetize an electronic compass. Complicated electronic compass calibration procedures are required on-site, and calibration may not be stable as the compass magnetization drifts with time. In addition, compass errors due to surrounding magnetic materials, such as metal roofs and magnetic declination, may exist. As a consequence, an azimuth measurement output of the OMU on a pole system and based on a mechanical or electronic compass can lead to errors in calculating sun position in relation to shading obstructions measured by the camera. Thus, systems, devices and methods for quickly and accurately measuring azimuth of a camera on a pole, may be desirable.

Various embodiments, as described herein, include capturing images with a camera, and determining the tilt orientation and location of the camera, as well as the azimuth of the camera. Various determined camera parameters may then be used to determine shading conditions of a structure. According to one embodiment, one or more aerial images of a job site including a structure (e.g., a house) may be obtained. The one or more aerial images may be obtained prior to an individual (e.g., a technician and/or installer) visiting the job site. As will be appreciated, aerial imagery is available from a variety of sources, such as Google Maps developed by Google of Mountain View, Calif. or PICTOMETRY® developed by Pictometry International Corp. of Rochester, N.Y. Using the one or more aerial images, one or more measurement locations around a perimeter of the structure for making on-site shading measurements can be determined. Alternatively, one or more measurement locations may be identified after one or more shade images are captured.

Figure 1:
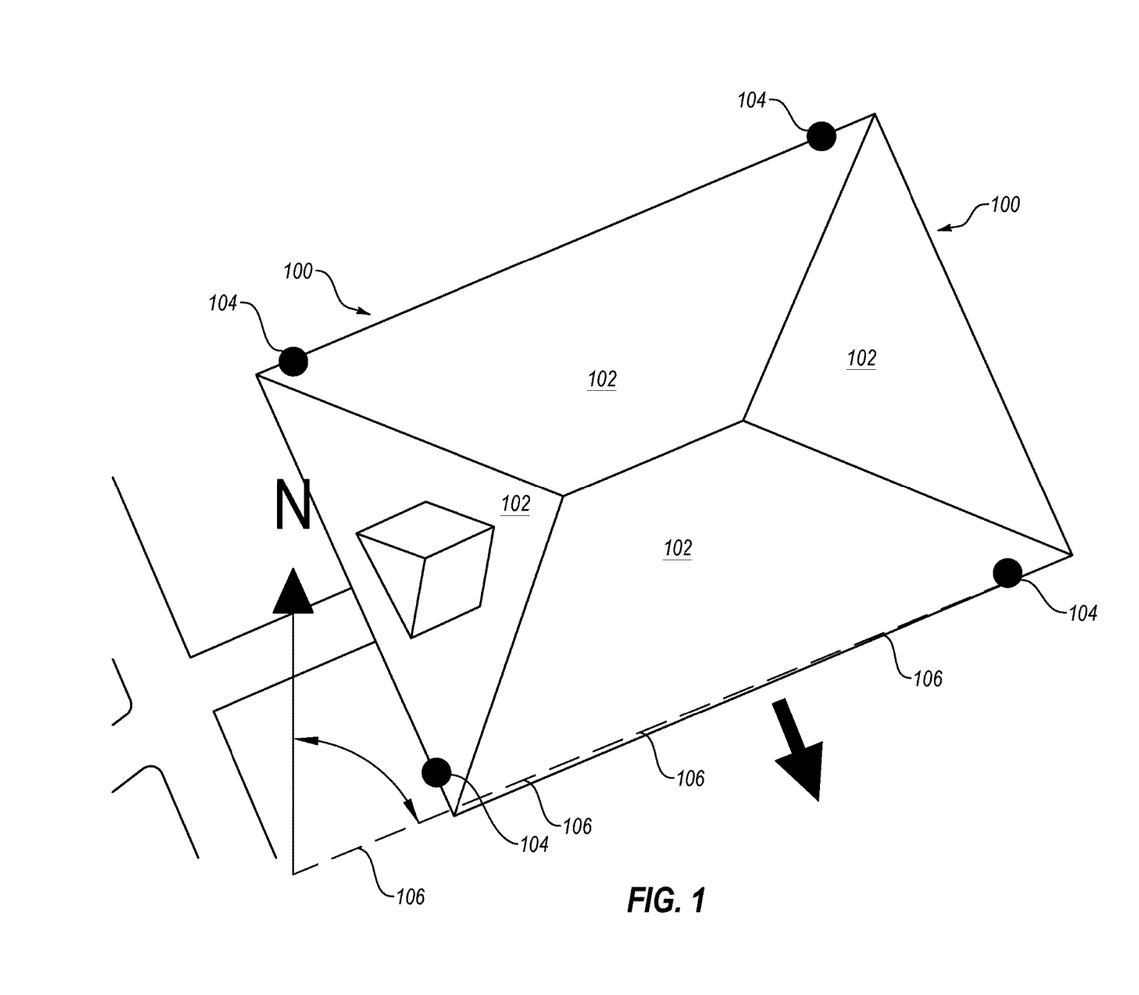
FIG. 1 illustrates example aerial imagery including a structure and designated measurement locations, in accordance with an embodiment of the present disclosure.

An example of an aerial image of a structure 100 including a roof 102 is shown in FIG. 1. Example measurement locations are depicted by reference numeral 104. Measurement locations 104 may be selected (e.g., by an operator) to optimize shading measurements proximate a location where one or more solar modules may be positioned (i.e., on roof 102).

According to an embodiment, one or more images may be captured at each measurement location 104, wherein each measurement location 104 has a known X, Y, and Z coordinate position (i.e., latitude, longitude, and altitude). It is noted that the altitude (i.e., Z coordinate) should be above an eave of roof 102. Although FIG. 1 includes four measurement locations, more or less measurement locations may be used. By way of example, the one or more images, which may comprise spherical images, may be captured via a spherical camera, two or more narrow field of view cameras, or any other suitable camera(s).

An orientation of a reference roof edge proximate a location 104, relative to the known orientation of the image, is depicted by line 106. In one example, the orientation of the reference roof edge may be determined off-site (e.g., by a computer operator) by viewing the aerial image and selecting two locations on the reference roof edge that includes a selected location 104. Typically the roof azimuth is the direction of a perpendicular to the roof edge. The azimuth angle of any line within an overhead aerial image may be determined by graphically determining the angular difference between the line and the reference orientation of the image. The reference orientation of the image is typically included in the Meta data of the image and is typically oriented such that the top of the image is north. As will be described more fully below, an angle of the reference roof edge relative to the accurately known orientation of the aerial image may be used to determine an azimuth of the camera.

As will be appreciated, a tilt of each section of roof 102 may be determined via, for example, oblique aerial imagery and/or on-site direct tilt measurements. Further, the orientation and tilt of the reference roof edge may be used to determine the azimuth of the camera and to estimate shading conditions proximate roof 102, as described more fully below.

Figure 2:
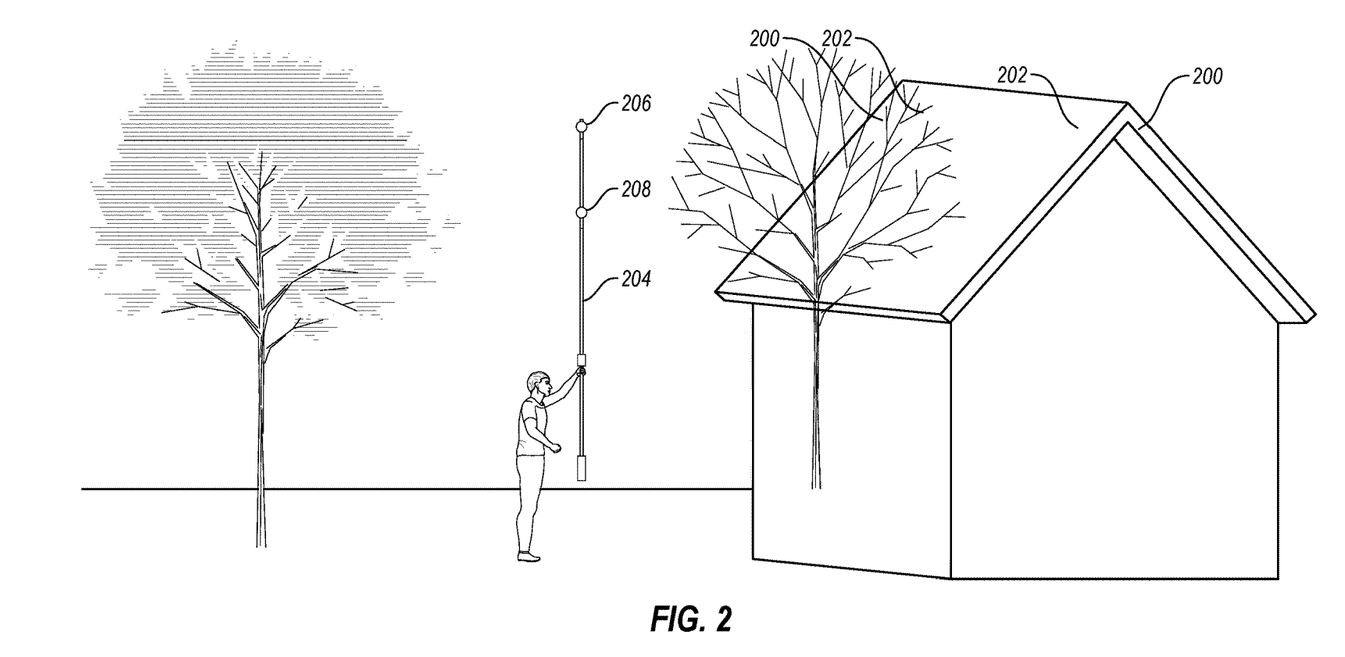
FIG. 2 is an illustration of a structure, and a camera and an indicator coupled to a pole positioned proximate the structure, according to an embodiment of the present disclosure.

FIG. 2 depicts a structure 200 including a roof 202. FIG. 2 further includes a pole 204 having a camera 206 mounted thereto. More specifically, camera 206 is mounted proximate an end (e.g., a top end) of pole 204. In one embodiment, camera 206 comprises a spherical camera. Pole 204 and camera 206 may collectively be referred to herein as an "image capture device." Further, in some embodiments, an image capture device includes an indicator 208, as described more fully below.

According to various embodiments, camera 206 may capture one or more images at one or more of locations 104, as shown in the aerial image of FIG. 1. The captured images may be linked to an associated location 104 in the aerial image and, thus, a location (e.g., latitude, longitude) of each image is known. In addition, a GPS measurement of a location of camera 206 when the image is captured can be used to verify the image location.

Figure 3:
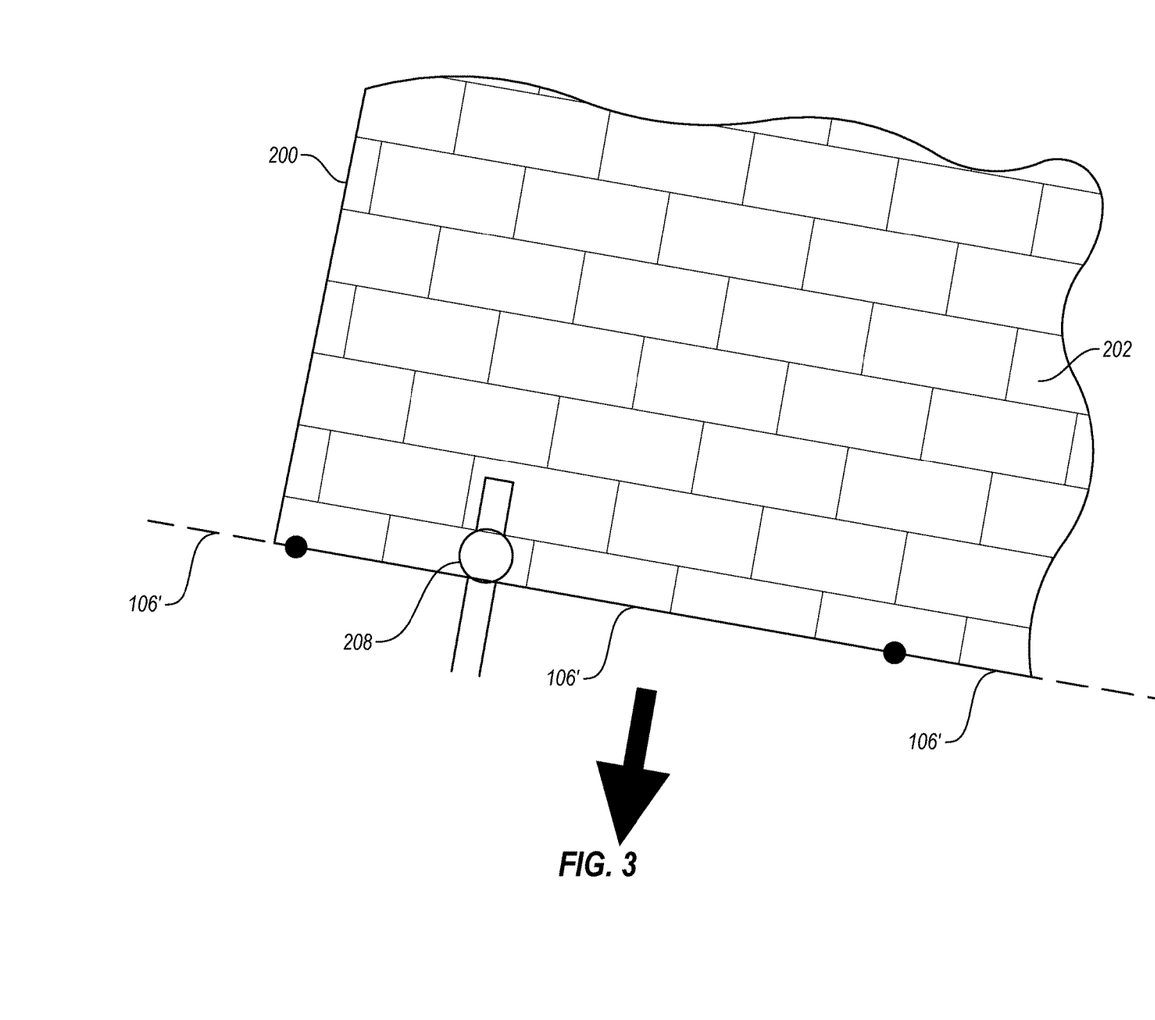
FIG. 3 is an illustration representing an image captured by the camera of FIG. 2, according to an embodiment of the present disclosure.

In accordance with one embodiment, an image capture device (e.g., a pole and a camera coupled thereto) is modified compared to that described in U.S. Provisional Pat. Application No. 62/182,937 with the inclusion of indicator 208. As one example, indicator 208 may comprise an indicator ball that is typically a bright color so that it is readily apparent in an image. In other examples, indicator 208 may comprise a different shape, such as a square or rectangle. Further, during use of pole 204, indicator 208 may be positioned above a roof edge so that indicator 208 is visible in a captured image. Further, during use of pole 204, indicator 208 may be positioned below camera 206. In general, indicator 208 may comprise any shape or color that may be apparent in an image. FIG. 3 is a downward projection of an image including 202, a reference roof edge 106', and indicator 208.

As will be appreciated, a 360-degree spherical image may contain information about surrounding shading obstructions (i.e., shading obstructions visible from a location where the image is taken). In one embodiment, a spherical camera may include a dual-axis electronic accelerometer (e.g., tilt gauge), which may be used to determine a direction substantially straight down and, thus, may divide the spherical image into two hemispheres (i.e., an upper hemisphere and a lower hemisphere). Shading conditions may be obtained from an upper hemisphere of the spherical image, covering all directions corresponding to all of the possible sun angles throughout a year. A lower hemisphere of the spherical image is a downward view (e.g., including the nearby roof, roof edge and the indicator). The downward view can be projected as a rectilinear image using photo manipulation software, such as open source software PanoTools (available online at www.panotools.org/). A downward looking rectilinear image may provide a more intuitive view of a roof compared to the apparently distorted wide field of view of the bottom hemisphere. In the rectilinear image, the straight roof edge appears straight. After completing a site survey with a pole-mounted camera, the reference roof edge in the image may be determined (e.g., via a computer operator) by identifying which edge is near indicator 208. By identifying two points on this reference roof edge within the bottom hemispherical image, the orientation of the camera relative to the roof edge ("relative camera angle") may be determined. A pointing direction of the camera is a vector originating at a center of the image sphere of the camera and extending radially outward in an arbitrary direction defined by the physical hardware of the camera (e.g., the front of the camera). The orientation of this vector relative to the pixels in the image is known because the orientation of the camera sensor and lens relative to the other camera hardware is fixed and known. The azimuthal pointing direction of the camera is thus the projection of this vector onto the horizontal plane as determined, for example, by a tilt sensor.

An orientation of the upper hemisphere is rigidly tied to the orientation of the lower hemisphere, therefore once the orientation of the lower hemisphere is known the orientation of the upper hemisphere may be known. The relative camera angle together with the absolute orientation of the roof edge ("absolute roof edge azimuth") as determined from the aerial image can be used to determine the absolute orientation of the upper hemisphere of the spherical image, given the known tilt of the roof edge.

According to one embodiment, when the roof edge in the lower hemisphere is substantially flat (e.g., when it is an eave or ridge) and the camera is directly over the roof edge, the azimuth of the camera is substantially equal to the absolute roof edge azimuth plus the relative camera angle.

Figure 4A:
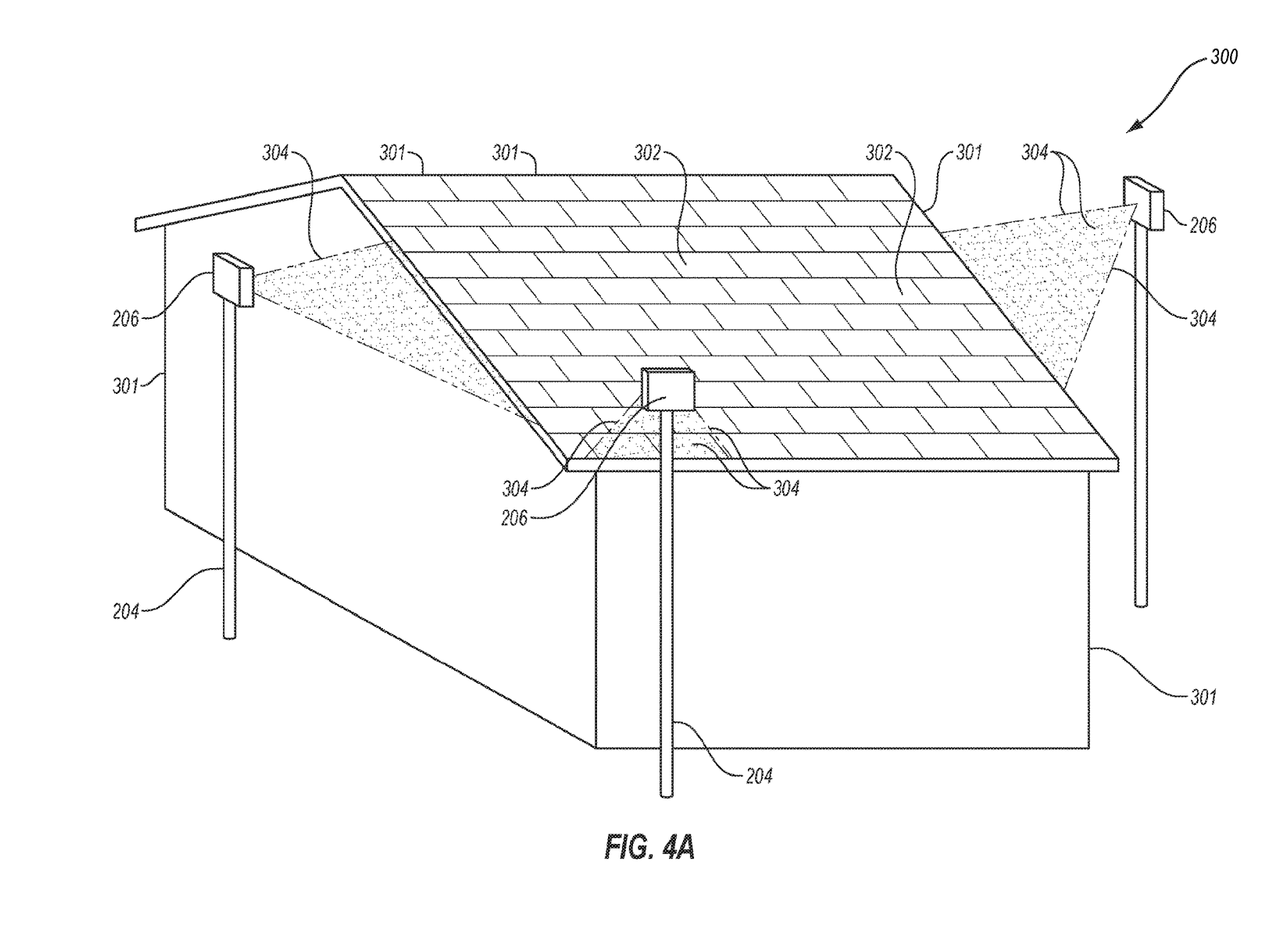
FIG. 4A is a perspective view of a structure including a roof and a plurality of cameras, in accordance with an embodiment of the present disclosure.
Figure 4B:
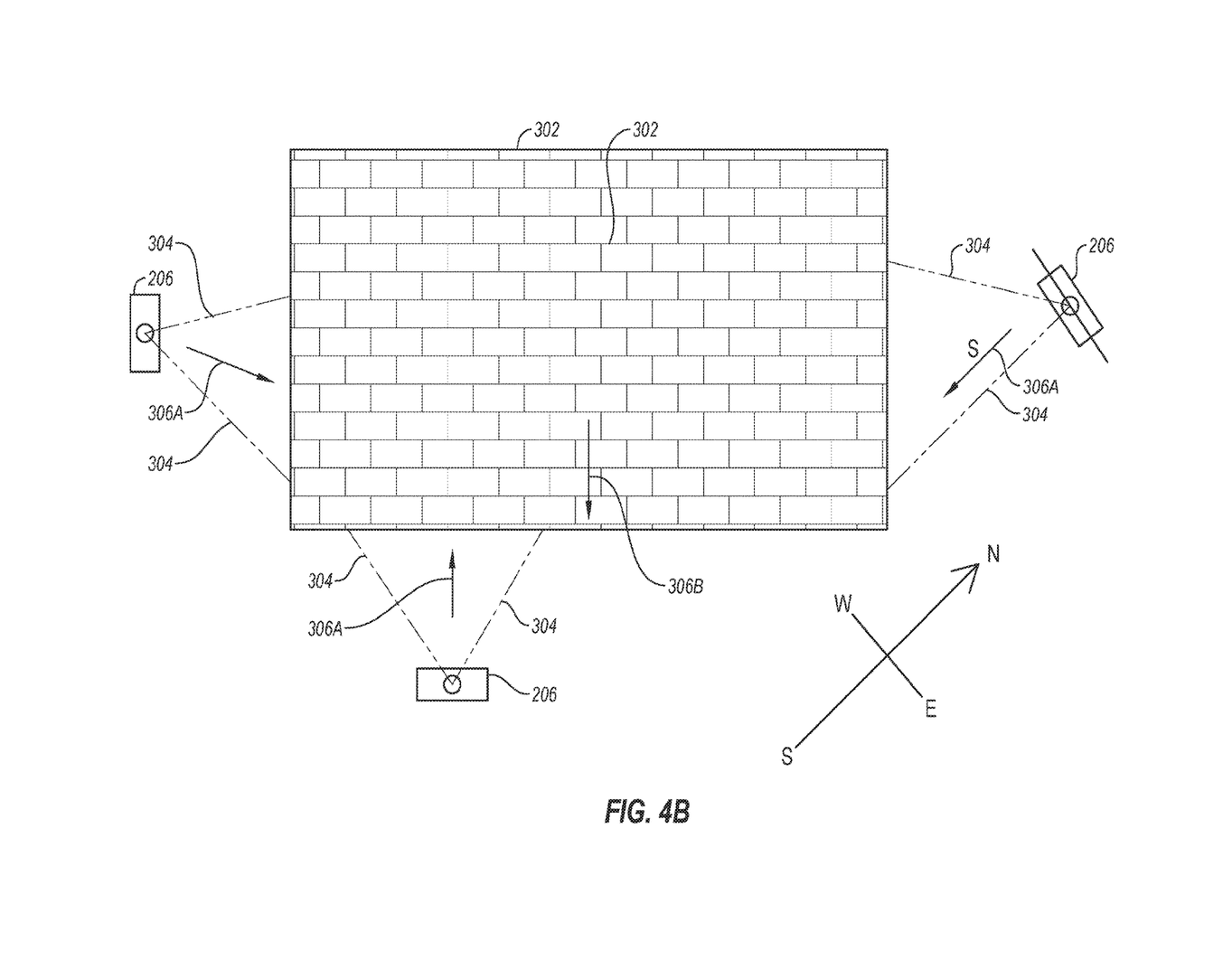
FIG. 4B is a top-down view of a structure and a plurality of cameras, according to an embodiment of the present disclosure.
Figure 4C:
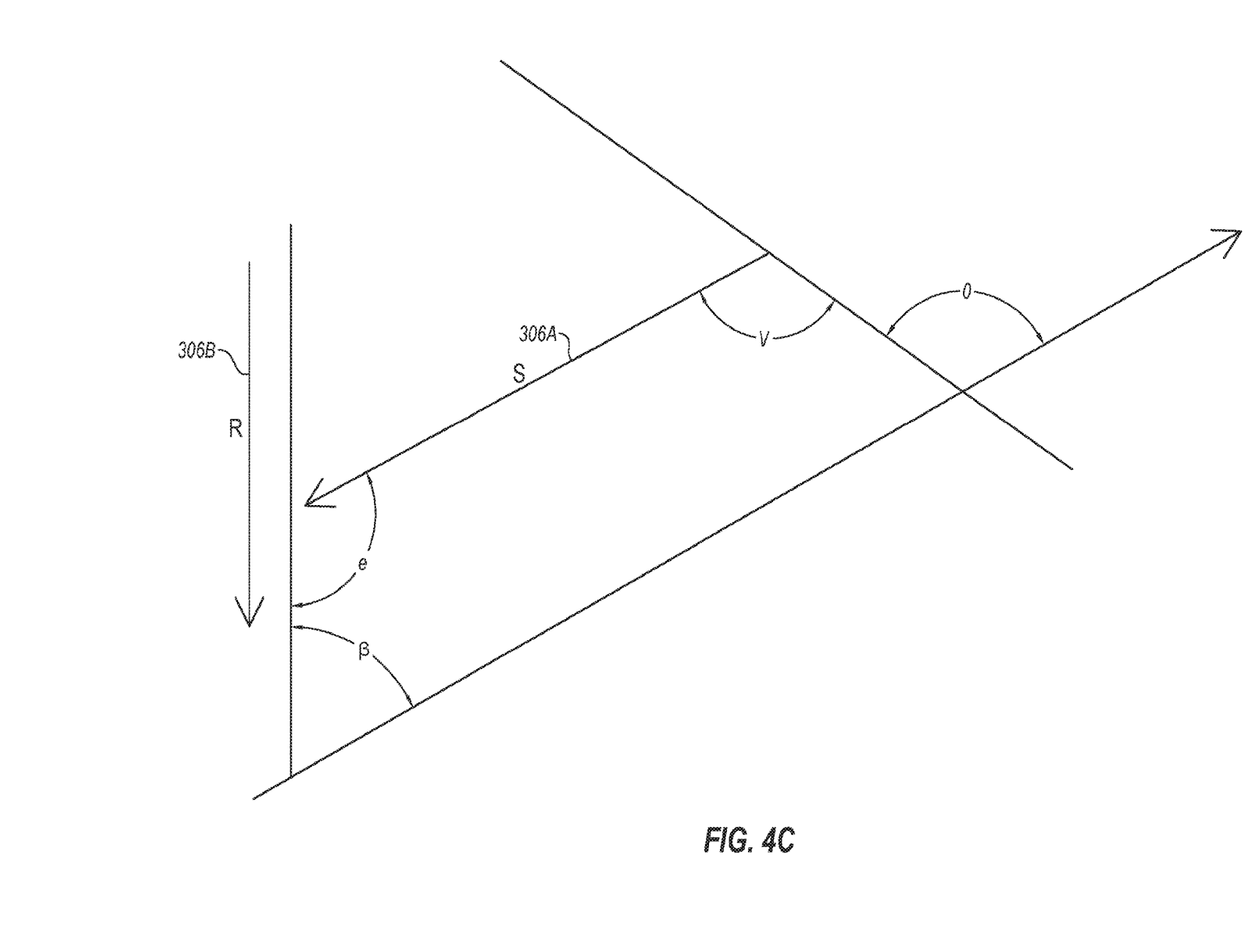
FIG. 4C depicts various vectors and angles of an example measurement process, in accordance with an embodiment of the present disclosure.

According to another embodiment, when the roof edge in the lower hemisphere is not flat (e.g., when it is a rake or hip) and the camera is directly over the roof edge, the azimuth of the camera is substantially equal to the absolute roof edge azimuth plus the relative camera angle. According to yet another embodiment, an algorithm, as described in reference to FIGS. 4A-4C, may enable extraction of an orientation of the image when the camera is not directly over the roof edge. With reference to FIGS. 4A-4C and equations (1)-(4) below, the algorithm for finding the orientation of a rectilinear centered gnomonic image using a manually identified roof edge of known orientation will now be disclosed. For simplicity, it is assumed that angles are expressed in radians north of east and slopes are rise/run.

FIG. 4A is a perspective view of a system 300 including a structure 301 having a roof 302. Further, system 300 includes a plurality of cameras 206, wherein each camera 206 is coupled to a pole 204. FIG. 4B is a top down view of system 300. In each of FIGS. 4A and 4B, a "plane of view," which may also be referred to herein as an "edge view plane," or an "observation plane" is indicated by reference numeral 304.

Initially, a unit vector, normal to the plane of view (i.e., including an identified roof edge and a viewpoint (i.e., the location point of camera 206)) may be determined. It is noted that the roof edge may be identified by coordinate ordered pairs. With reference to FIG. 4B, the unit vector extends into or out of the illustration (i.e., perpendicular to the page). It is noted that a determination may be made as to whether the viewpoint is above or below the roof. If the viewpoint is below the roof, the unit vector may be multiplied by −1.

Further, the observation plane may be expressed as a slope and a slope direction according to the following equations:

$$\text{ObservationPlane\_Slope} = \text{sqrt}(1-z^2)/z; \quad (1)$$

$$\text{ObservationPlane\_Slope\_Azimuth} = \text{arctangent}(y/x); \quad (2)$$

wherein x, y, z are the latitude, longitude, and altitude components.

It is noted that the signs of the components may be used to move "ObservationPlane_Slope_Azimuth" into a correct quadrant. It is further noted that "sqrt(1−z^2)" can be visualized as the length of arrow 306A in FIGS. 4B and 4C.

Further, using a known roof pitch angle ("Roof_Slope_Angle"), a known roof slope direction ("Roof_Slope_Azimuth"), and a known edge bearing ("Edge_Azimuth"), a slope of the identified edge ("Edge_Slope") may be determined as follows:

$$\text{Edge\_Slope} = \tan(\text{Roof\_Slope\_Angle}) \cdot \cos(\text{Edge\_Azimuth} - \text{Roof\_Slope\_Azimuth}). \quad (3)$$

FIG. 4C depicts various vectors and angles of an example measurement process, in accordance with an embodiment of the present disclosure. With reference to FIG. 4C, the cosine of an angle e (i.e., the angle between the slope direction of the observation plane and the azimuth of the identified roof edge) is equal to the slope of the identified roof edge divided by the slope of the observation plane. It is noted that a potential domain error in arc-cosine may exist and may be corrected (i.e., if observation is from above the roof, angle e=e*−1).

With continued reference to FIGS. 4A-4C, the unit vector, as noted above, describes the orientation of the observation plane. Arrow 306A is the projection of unit vector onto a horizontal plane. Arrow 306B is the slope of the roof projected onto the roof edge (i.e., the slope of the edge) further projected onto a horizontal plane. Further, with specific reference to FIG. 4C, the cosine of the angle between R and S (i.e., angle e) is the cosine of the ratio of their lengths (i.e., $\cos(e)=|R|/|S|$). The orientation of the camera is found by combining angle e with the known orientation of the roof edge and its apparent orientation in the gnomonic (i.e., rectilinear) nadir view. Further, the azimuth of the camera (angle o) may be determined according to the following equation:

$$\text{angle } o = \text{angle } v + \text{angle } e + \text{angle } \beta - \pi; \quad (4)$$

Once the azimuth of the upper hemisphere of the camera is known, the sun position at all times of the year may be determined (e.g., according to various embodiments disclosed in U.S. Pat. No. 7,873,490). Further, the shading and solar access can be determined.

As noted above, in one embodiment, a user may locate a reference roof edge. In another embodiment, image processing may be used to locate reference roof edge 106 (see FIG. 1). In this embodiment, rather than a user (i.e., a human operator) clicking along a roof edge of an image, a computer algorithm may perform edge detection using known image processing techniques to identify the strongest (i.e., most pronounced) edges in an image. In addition, image processing techniques may be used to identify an indicator (e.g., indicator 208) in the image. Further processing may identify the highest probability identification of the edge associated with the indicator. Once a roof edge is identified, the azimuth may be determined as described above.

In the embodiments disclosed above, an indicator (e.g., indicator 208; see FIG. 2) may simplify the task of locating a roof edge (i.e., for a user or an image processor) because the user of the pole may position the indicator above and near the roof edge. In other embodiments not including an indicator, the operator or image processor may identify the pole in the image or may infer the location of the pole or roof edge using one or more tilt sensors. For example, a roof edge is likely to be near the vector that extends from the camera in the direction of gravity when the camera is placed above the roof edge during operation of the pole.

Further, a user (i.e., of the pole) may position the indicator, the pole, and/or the camera above and proximate the roof edge. This may simplify a task of locating the roof edge for the user or the image processor because the roof edge is known to be below the camera. In other embodiments, the user may position the indicator, the pole, and/or the camera a certain distance from the roof edge in an X, Y, and/or Z location, or at an arbitrary location relative to the roof edge. The user or image processor may use other techniques to identify the roof edge in the image such as with pattern recognition of elements of the roof or structure.

In various embodiments disclosed herein, a pole is used to position a camera proximate a roof. However, the present disclosure is not so limited. In U.S. Provisional Pat. Application No. 62/182,937, which is incorporated by reference in its entirety, discloses other means of positioning a camera proximate a roof, including drones, remote control vehicles, kites, etc., all of which may be used in the present disclosure.

In some embodiments, the tilt of a camera may be captured with a tilt sensor. In other embodiments, the orientation of a camera relative to the Earth's gravity may be determined by other means, including via a user or automatically with image processing. In one example, a bubble level may be attached to a camera or pole in the field of view of the camera. In another example, a plumb may be hung from the camera and in the field of view of the camera. The bubble level and/or plumb provide a reference for the gravitational vector and may be identified in the image by the operator or by image processing.

Figure 5:
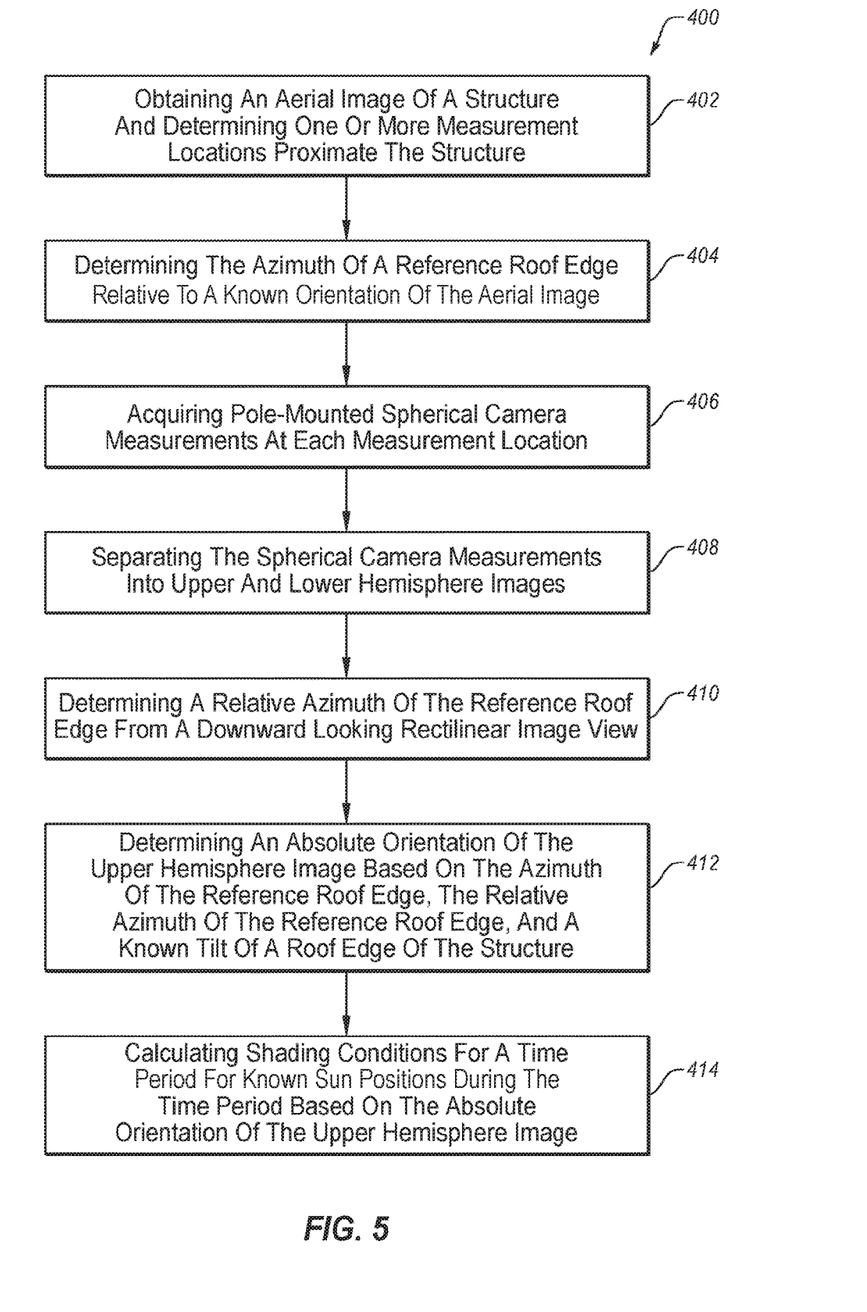
FIG. 5 is a flowchart depicting a method, according to an embodiment of the present disclosure.

FIG. 5 is a flowchart of a method 400, according to an exemplary embodiment of the present disclosure. The acts of method 400 may be included in a process of determining shading conditions and solar access determination, according to an exemplary embodiment of the present disclosure. Although illustrated as discrete blocks, various blocks of method 400 may be divided into additional blocks, combined into fewer blocks, or eliminated, depending on the desired implementation.

Method 400 includes obtaining an aerial image of a structure and determining one or more measurement locations proximate the structure (depicted by numeral 402). Method 400 further includes determining an azimuth of a reference roof edge relative to a known orientation of the aerial image (depicted by numeral 404). Further, method 400 includes acquiring pole-mounted spherical camera measurements at each measurement location (depicted by numeral 406). In addition, method 400 includes separating the aerial image into upper and lower hemisphere images (depicted by numeral 408). By way of example, the aerial image may be separated into upper and lower hemisphere images using a tilt sensor. Further, method 400 includes determining a relative azimuth of the reference roof edge from a downward looking rectilinear view (depicted by numeral 410). Moreover, method 400 includes determining an absolute orientation of the upper hemisphere based on the azimuth of the reference roof edge, the relative azimuth of the reference roof edge (e.g., in the rectilinear projections), and a known tilt of a roof edge of the structure (depicted by numeral 412). Additionally, method 400 includes calculating shading conditions for a time period for known sun positions during the time period based on the orientation of the upper hemisphere of the at least one spherical image (depicted by numeral 414).

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

An additional advantage of a spherical image is that it typically includes a field of view that encompasses a large area of the roof. This can show the approximate location and height of nearby on-roof obstructions (e.g., vent pipes) that might not be visible is the coarser resolution aerial images. The location of these obstructions is important in determining the placement of modules to avoid mechanical interference, and to avoid shading from the on-roof features.

Figure 6:
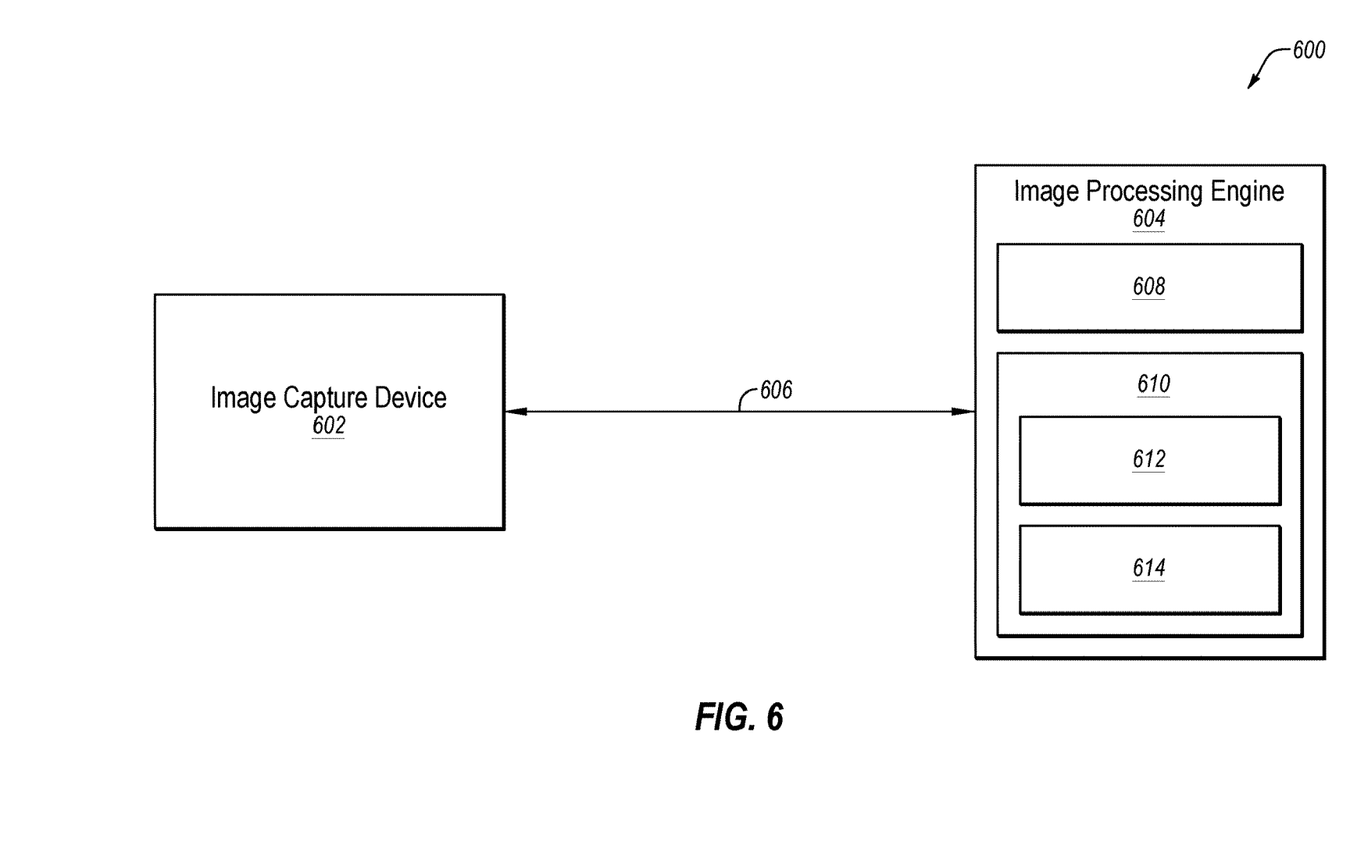
FIG. 6 depicts a system, according to an embodiment of the present disclosure.

With reference to FIG. 6, according to one embodiment of the present disclosure, a system 600 includes at least one image capture device (ICD) 602 configured to capture one or more images of a roof, an area surrounding the roof, or a combination thereof. Image capture device 602 may be configured to enable a user to capture the one more images without the user climbing on the roof. Image capture device 602 may further be configured to convey the one or more images (i.e., via a wired and/or wireless connection).

By way of example, the at least one image capture device 602 may comprise a camera. More specifically, the one or more image capture devices 602 may include at least one camera including, for example, a spherical camera, two or narrow field of view cameras, or any other suitable camera(s). The one or more image capture devices 602 may comprise, for example, handheld devices, pole-mounted devices, satellite-mounted devices, manned aircraft-mounted devices, and/or un-manned aircraft-mounted (e.g., drone) devices. It is noted that the one or more image capture devices 602 may be used in any suitable manner to capture images of the roof and/or the roofs surroundings.

System 600 may further include an image processing engine 604 communicatively coupled to image capture device 602 via a connection 606, which may comprise a wired connection, a wireless connection, or a combination thereof. According to one embodiment, image processing engine 604 may receive data from image capture device 602.

With continued reference to FIG. 6, image processing engine 604 may comprise a processor 608 and memory 610. Memory 610 may include an application program 612 and data 614, which may comprise stored data (e.g., images). Generally, processor 608 may operate under control of an operating system stored in memory 610, and interface with a user to accept inputs and commands and to present outputs. Processor 608 may also implement a compiler (not shown), which allows one or more application programs 612 written in a programming language to be translated into processor readable code. In one embodiment, instructions implementing application program 612 may be tangibly embodied in a computer-readable medium. Further, application program 612 may include instructions which, when read and executed by processor 608, may cause processor 608 to perform the steps necessary to implement and/or use embodiments of the present disclosure. It is noted that application program 612 and/or operating instructions may also be tangibly embodied in memory 610, thereby making a computer program product or article of manufacture according to an embodiment of the present disclosure. As such, the term "application program" as used herein is intended to encompass a computer program accessible from any computer-readable device or media. Furthermore, portions of application program 612 may be distributed such that some of application program 612 may be included on a computer-readable media within image processing engine 604, and some of application program 612 may be included in another electronic device (e.g., a camera of image capture device 602). Furthermore, application program 612 may run partially or entirely on a smartphone or remote server.

Various embodiments described herein may include the use of a special-purpose or general-purpose computer including various computer hardware or software modules, as discussed in greater detail below. Further, as indicated above, embodiments described herein may be implemented using computer-readable media for having computer-executable instructions or data structures stored thereon.

Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general-purpose or specific-purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and methods described herein are generally described as being implemented in software (stored on and/or executed by general-purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventors to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   determining an azimuth of a reference roof edge relative to an orientation of an aerial image of a structure;
   capturing at least one spherical image at at least one determined measurement location proximate the structure, the capturing comprising capturing the at least one spherical image via a spherical camera coupled to a pole and having at least a portion above at least a portion of a roof of the structure;
   locating the reference roof edge in the at least one spherical image via one or more indicators in the at least one spherical image;
   determining a relative azimuth of the reference roof edge from a downward view of a lower hemisphere of the at least one spherical image;
   determining an orientation of an upper hemisphere of the at least one spherical image based on the azimuth of the reference roof edge, the relative azimuth of the reference roof edge, and a known tilt of a roof edge of the structure; and
   calculating shading conditions for a time period for known sun positions during the time period based on the orientation of the upper hemisphere of the at least one spherical image.

2. The method of claim 1, further comprising obtaining the aerial image of the structure.

3. The method of claim 2, further comprising identifying the at least one measurement location in the aerial image.

4. The method of claim 1, further comprising identifying the lower hemisphere and the upper hemisphere of the at least one spherical image.

5. The method of claim 1, wherein calculating shading conditions comprises identifying shading objects in the upper hemisphere of the at least one spherical image.

6. The method of claim 1, further comprising determining an orientation of the reference roof edge via at least one of a human operator and an image processor.

7. The method of claim 6, wherein determining the orientation of the reference roof edge comprises selecting a first location of the reference roof edge at a first determined measurement location of the at least one determined measurement location and selecting a second location of the reference roof edge at a second determine measurement location of the at least one determined measurement location.

8. The method of claim 1, further comprising positioning a spherical camera proximate to and above the roof edge of the structure.

9. The method of claim 1, wherein capturing the at least one spherical image comprises positioning an image capture device, including a pole having the spherical camera and an indicator coupled thereto, at each of the at least one determined measurement location, wherein each of the spherical camera and the indicator are positioned above the roof edge of the structure and the spherical camera is positioned above the indicator.

10. The method of claim 1, wherein capturing the at least one spherical image comprises capturing the at least one spherical image with a spherical camera including a dual-axis electronic accelerometer for determining the downward view of the lower hemisphere of the at least one spherical image and an upward view of the upper hemisphere of the at least one spherical image.

11. The method of claim 1, further comprising determining the tilt of the roof edge via at least one of the aerial image and one or more tilt measurements of the roof edge.

12. A non-transitory computer-readable storage medium storing instructions that when executed by a processor cause the processor to perform instructions, the instructions comprising:
   determining an azimuth of a reference roof edge relative to an orientation of an aerial image of a structure;

determining a relative azimuth of the reference roof edge from a downward view of a lower hemisphere of at least one spherical image captured proximate the structure at at least one determined measurement location, the at least one spherical image captured via a camera having at least a portion above at least a portion of a roof of the structure;

locating the reference roof edge in the at least one spherical image via one or more indicators in the at least one spherical image;

determining an orientation of an upper hemisphere of the at least one spherical image based on the azimuth of the reference roof edge, the relative azimuth of the reference roof edge, and a known tilt of a roof edge of the structure; and calculating shading conditions for a time period for known sun positions during the time period based on the orientation of the upper hemisphere of the at least one spherical image.

13. The non-transitory computer-readable storage medium of claim 12, further comprising identifying the at least one determined measurement location in the aerial image.

14. The non-transitory computer-readable storage medium of claim 12, further comprising identifying the reference roof edge.

15. The non-transitory computer-readable storage medium of claim 12, wherein calculating shading conditions comprises identifying shading objects in the upper hemisphere of the at least one spherical image.

16. The non-transitory computer-readable storage medium of claim 12, further comprising identifying the lower hemisphere and the upper hemisphere of the at least one spherical image.

17. The non-transitory computer-readable storage medium of claim 12, wherein determining the relative azimuth of the reference roof edge from the downward view comprises determining the relative azimuth via a downward rectilinear view.

\* \* \* \* \*